(No Model.)
E. I. BRANNAN.
CIRCLE CYCLE.
No. 533,838. Patented Feb. 5, 1895.
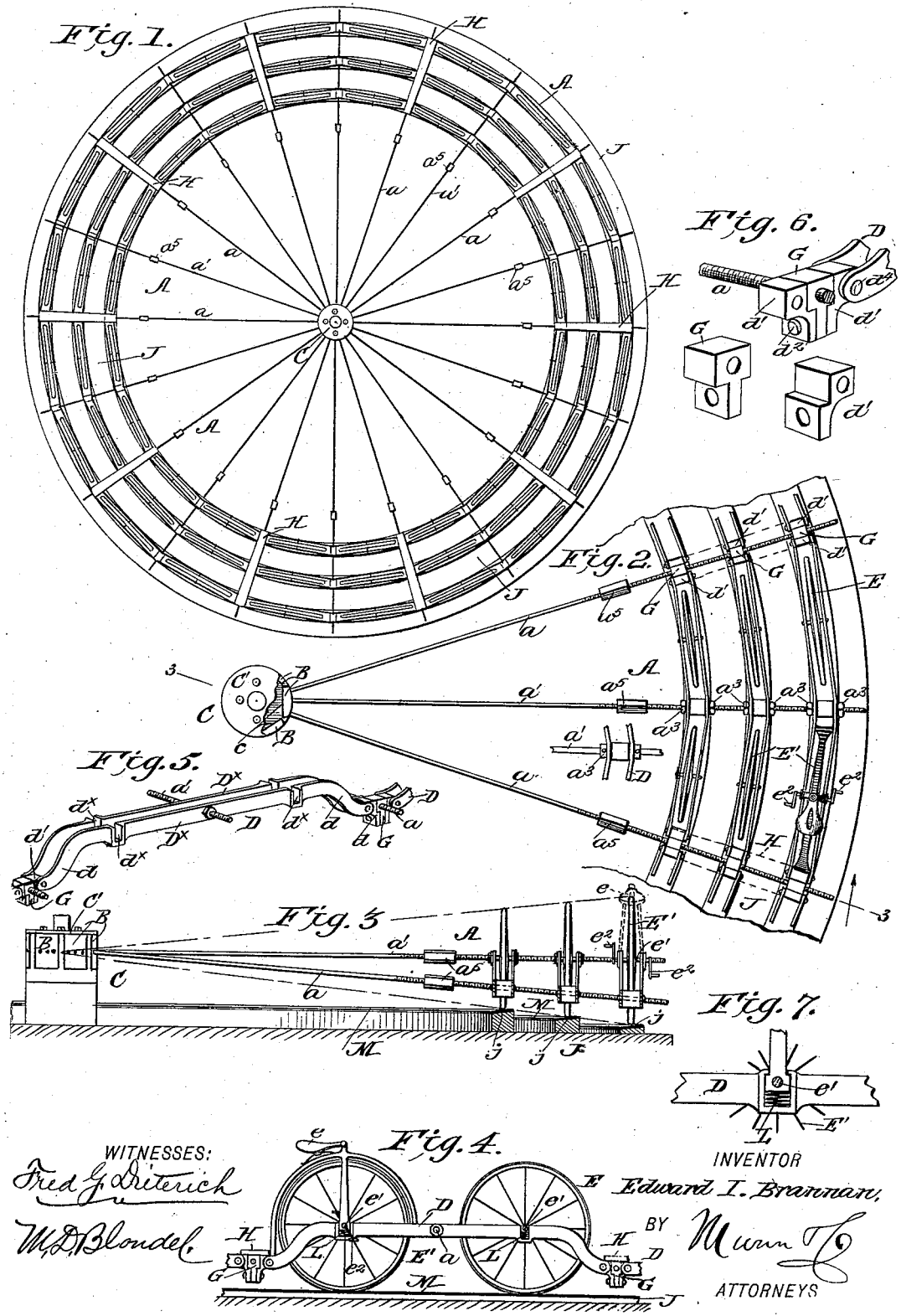
WITNESSES:
Fred G. Dieterich
M. D. Blondel
INVENTOR
Edward I. Brannan,
BY
Munn & Co.
ATTORNEYS

UNITED STATES PATENT OFFICE.

EDWARD INDEPENDENCE BRANNAN, OF RICHMOND, VIRGINIA.

CIRCLE-CYCLE.

SPECIFICATION forming part of Letters Patent No. 533,838, dated February 5, 1895.

Application filed October 5, 1892. Serial No. 447,957. (No model.)

*To all whom it may concern:*

Be it known that I, EDWARD INDEPENDENCE BRANNAN, residing at Richmond, in the county of Henrico and State of Virginia, have invented a new and useful Circle-Cycle, of which the following is a specification.

My invention relates to that class of apparatus, which includes "merry-go-rounds," "flying horses" and the like, used at fairs, picnic grounds, excursion resorts, &c., and it has for its object, to provide an apparatus of this character, simple and cheap in its construction, by which the rider can obtain all the advantages of ordinary bicycle riding, without the danger of accidents, usually incident to this class of amusement apparatus.

It has also for its object to provide an apparatus of this kind, formed of sections detachably connected in such a manner that the same can be quickly taken apart, and stored up in a small compass for transportation from one point to another.

With other minor objects in view, all of which will hereinafter appear, my invention consists in the peculiar combination of parts and details of construction hereinafter fully described in the specification and particularly pointed out in the claims, reference being had to the accompanying drawings, in which—

Figure 1 is a diagrammatic plan view of my improved apparatus. Fig. 2 is a plan view of one of the sections, a portion of the track or bed, and the turn post. Fig. 3 is a vertical section of the same on the line 3—3 Fig. 2. Fig. 4 is an end elevation of one section. Fig. 5 is a detail view of one of the end supports or frames, and Figs. 6 and 7 are detail views hereinafter referred to.

By referring to Fig. 1 of the drawings it will be noticed my improved cycle consists of a number of sections joined at their inner ends on a common axis or central turn post, while their outer ends carry a plurality of yokes or supporting frames, three being shown in the drawings, it being obvious however that a lesser or greater number may be employed.

Each section A consists of the rods $a$ $a$ $a'$, which radiate from a segment or securing block B, dovetail in horizontal section, which seats in a dovetail recess $c$ in the center or turn post C, and such blocks are held in their seats by a removable cap plate C'.

The supporting frames D, one of which is shown in detail in Fig. 5 are formed each of a pair of parallel bars $D^\times$ $D^\times$ bent down at their ends as at $d$, in which ends are held clip blocks $d'$, and intermediate such ends are formed journal bearing sockets $d^\times$ which receive the axles of the bicycle wheels E E'.

It should be stated, that a pair of bicycle wheels is supported in each frame D, one in advance of the other, the forward one E, being adapted for lady riders, while the rear one is intended for gentlemen riders, such rear ones having the usual seat $e$, crank axles $e'$ and pedals $e^2$ as shown.

While I have not shown any special means for driving the front or ladies' wheels, I desire it understood, that in practice I may employ any of the ordinary means for propelling such wheels, such as chain and sprocket devices. In some instances instead of arranging the seats over the lady's wheel in the usual manner, the same can be secured at a point between the pair of front wheels, in which case they serve to form rests for children or inexperienced riders.

It will be observed by reference to Fig. 3, that the central rod $a'$ projects out in a horizontal plane from the turn post, and passes through the central portion of the frame D, while the outer rods $a$ $a$ of each section A, project downward and connect through the medium of an adjustable clip or nut G with the blocks $d'$ in the ends of the said frame D. By this construction it will be observed that at a point between the front of the lady's wheel of one section, and rear of the gentleman's wheel of the next section, a depression is formed by the bent end of the frames D, upon which is held a platform board H, which forms a low and convenient step from which the riders can quickly vault onto the seats of the wheels.

To provide means whereby the frames D can be quickly adjusted radially to and from the turn post, so as to keep the several sections in proper alignment, the ends of the rods $a$ $a'$ are threaded, the rod $a'$ passing through smooth apertures in the center of the frames D, whereby such frames are adapted to be slid on such rod, it being held to its adjusted position by the jam nuts $a^3$ $a^3$. Any other means for the same purpose, may however be employed, as for instance, the rod $a'$ may be smooth, and slidable collars movably held thereon by set screws may be used. (See Fig. 2.) By connecting the ends of the rod $a$ to the swivel block G (see Fig. 6) and connecting with it, the clip blocks $d'$ but a single bolt $d^2$ need be used for securing the adjacent ends of the sections together. The adjustment of the clip G on the threaded rod is readily accomplished by withdrawing the bolts $d^4$, which secure the clips in the ends of the frames D, and when drawn permits the block G and the clip $d'$ to turn about the rod.

The track J which may be a number of annular rings placed upon the ground or a series of sections joined together, has its upper face tapered downward and inward as at $j$, whereby a bevel trackway is formed, which serves to hold the wheels from an undue outward throw when the riders are on.

It will also be noticed in Fig. 3 that the sizes of the wheels decrease proportionally to their relation to the turn post, the outer wheels being the largest and the inner ones the smallest, the decline in size being indicated by the broken line in Fig. 3. This construction has two advantages. First, it provides for an equal rotation of all the wheels at each complete revolution about the turn post, and, secondly, provides irregular sizes to accommodate different sized riders.

Each of the wheels E E' is journaled upon spring bearings L held in the sockets $d^\times$ (see Fig. 7) of the frames D, which serve to normally hold the wheels to a very light contact with the track, they being practically supported on the rods $a$ $a'$, such arrangement serving to hold the empty wheels from frictional contact with the track during the operation of the machine. To render the riding easy and to allow for the use of cheaply constructed wheels, the track ways have a yielding contact face M. The rods $a$ $a'$ are formed of sections connected by turn buckles $a^5$.

From the foregoing description taken in connection with the drawings the advantages of my improved apparatus will readily appear. The same is exceedingly simple, effective, and means are provided for connecting, disconnecting and adjusting the several parts.

The riders can easily reach the seats on the wheels, great speed can be attained, and all the wheels, large and small, making the same number of revolutions, whereby an even momentum is maintained, and by inclining the track way as shown the outward or tangential motion is largely overcome.

It is manifest that when necessary other power than foot power may be used, and that the cycle can be constructed of as many sections as desired.

Having thus described my invention, what I claim, and desire to secure by Letters Patent, is—

1. In combination, in an apparatus as described, the turn post, the circular track way, the radiating supporting sections, including the frames D, the supporting wheels, having a yielding bearing on such frames, whereby they are normally held from contact with the track ways, as and for the purpose described.

2. In combination, in an apparatus as described, the circular trackway, having a yielding bearing face, the turn post, the radial supporting frames connected thereto, and the wheels mounted in such frames for engagement with such track way all substantially as and for the purpose described.

3. In an apparatus as described, the combination with the circular track way and the central turn post, of the radiating rods, arranged in sections, each consisting of a central horizontal member $a'$ and outer downwardly inclined members $a$ $a$, the frames D centrally supported on the rod $a'$ its ends bent downward and supported on the rods $a$ $a$ the wheels E E' journaled in such frames, and the platform H supported on the downwardly bent ends of the frames D, all substantially as and for the purpose described.

4. In an apparatus substantially as described, the combination with the circular track way and the central turn post, of the radial rods $a$ $a'$ $a$, the wheel carrying frames D, formed of a central portion adjustably supported on the rod $a'$ said frames consisting of parallel members bent down at their ends, clip blocks held in such ends, the blocks G adjustably held on the ends of the rods $a$ $a$ and means for connecting the clip blocks and the blocks G, all substantially as shown and described.

5. In an apparatus as described, in combination a circular trackway having a yielding bearing face, the turn post, the radial supports or frames projected therefrom, the supporting wheels having non yielding bearing faces, mounted in the supporting frames normally held from contact with the yielding faces of the trackway, substantially as and for the purposes described.

6. In an apparatus substantially as described, the combination of the turn post, the circular trackway and the radial arms projected from the turn post and the wheel supporting frames mounted on the said radial arms, each formed of a plurality of concentrically arranged sections, each having yielding bearings, and the supporting wheels arranged in a series in radial alignment and independently journaled in such frame sections, whereby as one wheel of each series is depressed by the weight of the rider, the remaining wheels in such section will be held from light frictional contact with the trackway, all as and for the purposes described.

EDWARD INDEPENDENCE BRANNAN.

Witnesses:
A. G. H. BARNS,
WM. M. HILL.